United States Patent [19]

Meyer et al.

[11] 4,307,980

[45] Dec. 29, 1981

[54] PROCESS FOR CONSOLIDATING AND SEALING OFF GEOLOGICAL AND ARTIFICIALLY DEPOSITED ROCK AND EARTH FORMATIONS

[75] Inventors: Frank Meyer; Hans Mehesch, both of Essen; Rolf Kubens, Odenthal; Martin Winkelmann, Leverkusen, all of Fed. Rep. of Germany

[73] Assignees: Bergwerksverband GmbH, Essen; Bayer Aktiengesellschaft, Leverkusen, both of Fed. Rep. of Germany

[21] Appl. No.: 127,019

[22] Filed: Mar. 4, 1980

[30] Foreign Application Priority Data

Mar. 6, 1979 [DE] Fed. Rep. of Germany ....... 2908746

[51] Int. Cl.³ .................. C08G 18/76; E02B 3/12; E02D 3/12; E21B 33/138
[52] U.S. Cl. .................. 405/264; 166/295; 260/18 TN; 521/122
[58] Field of Search ............... 166/295, 294; 405/264, 405/266; 260/18 TN; 521/122

[56] References Cited

U.S. PATENT DOCUMENTS

| | | | |
|---|---|---|---|
| 3,181,611 | 5/1965 | Dollarhide | 166/295 |
| 3,607,794 | 9/1971 | Abbotson et al. | 260/18 TN X |
| 3,637,019 | 1/1972 | Lee | 166/295 |
| 3,719,050 | 3/1973 | Asao et al. | 61/36 R |
| 3,805,531 | 4/1974 | Kistner | 166/295 |
| 3,882,684 | 5/1975 | Meyer et al. | 405/264 |
| 3,949,559 | 4/1976 | Meyer | 166/295 |
| 3,983,081 | 9/1976 | Dieterich et al. | |
| 4,052,347 | 10/1977 | Dieterich et al. | |
| 4,056,937 | 11/1977 | Suzuki | 61/36 B |
| 4,113,014 | 9/1978 | Kubens et al. | 166/295 |
| 4,114,382 | 9/1978 | Kubens et al. | 405/264 |
| 4,139,676 | 2/1979 | Janssen et al. | 166/295 |
| 4,198,487 | 4/1980 | Scholl et al. | 521/122 |

FOREIGN PATENT DOCUMENTS

| | | |
|---|---|---|
| 1758185 | 11/1972 | Fed. Rep. of Germany . |
| 1784458 | 4/1973 | Fed. Rep. of Germany . |
| 48-9325 | 3/1973 | Japan . |

OTHER PUBLICATIONS

U.S. application Ser. No. 930,128.

*Primary Examiner*—Stephen J. Novosad
*Attorney, Agent, or Firm*—Gene Harsh; Lawrence S. Pope; Thomas W. Roy

[57] ABSTRACT

Waterglass solutions are mixed with polyisocyanates and these emulsions are then left to harden in the formations. Introduction of the mixture into the formations which are required to be consolidated, e.g. deposits of coal, is mainly carried out by forcing the mixture under pressure into bore-holes in the formations. According to one variation of the process, the components of the mixture are introduced into the multi-chamber cartridges which are introduced into the bore-holes and then destroyed as the components are mixed. Certain additives such as accelerators, blowing agents, polyols, stabilizers and/or thixotropic agents are advantageous for the quality of the composite masses formed by hardening of the mixture.

18 Claims, No Drawings

PROCESS FOR CONSOLIDATING AND SEALING OFF GEOLOGICAL AND ARTIFICIALLY DEPOSITED ROCK AND EARTH FORMATIONS

BACKGROUND OF THE INVENTION

In underground coal mining, consolidation and sealing of geological and artificially deposited rock and earth formations are carried out to a very large extent with polyurethane systems, see:
Journal: Glückauf (1968), pages 666–670;
Journal: Glückauf (1977), pages 707–711;
Journal: Bergbau (1977), pages 124–129;
German Pat. No. 1,758,185;
German Pat. No. 1,784,458.

Two component polyurethane systems are generally forced under pressure into the formations which are required to be consolidated. The starting components used for these systems are generally commercial polyisocyanates and polyols having a molecular weight from 400 to 600 and a hydroxyl number of 350 to 400. According to German Pat. No. 2,436,029, the polyols are rendered flexible with polyols having a hydroxyl number from 50 to 90 and a molecular weight from 2,000 to 35,000.

Natural limits to the possibilities of using polyurethane are given by rock formations which carry water since water destroys the polyisocyanate and thereby significantly interferes with the stoichiometric proportions of the reactants. In addition, water and polyisocyanates preferentially react to form polyureas whch do not adhere to the cracks and fissures in the rock. Warnings are always given that in consolidation work carried out with polyurethanes, water must be kept away from the zones of rock which are required to be consolidated. See Glückauf (Journal) (1972), pages 10 to 13.

One fundamental disadvantage of using polyurethanes in coal mining is that the hardened product is readily combustible. When substantial quantities of hardened polyurethanes are situated in fissures in the coal, fire due to spontaneous ignition of coal is liable to be spread by polyurethanes. Attempts have therefore been made to overcome the disadvantages of polyurethane by using systems which are virtually incombustible and obtainable in an aqueous form so that consolidation may also be carried out in moist or wet formations.

Extensive experiments, for example, have been carried out with aqueous formaldehyde-urea solutions. Sufficient consolidation could, however, not be achieved with these systems because the products obtained undergo severe shrinkage during the hardening process.

Attempts have also been made to use water glass solutions for consolidation. The hardening of water glass solutions requires the addition of hardeners. Acids and substances which give rise to acids such as phosphoric acid, sulphonic acid, esters, e.g. glycerol triacetate, ethyl acetate and other organic substances, such as formamide and glyoxal are used for this purpose. Calcium chloride, aluminum sulphate, magnesium chloride, magnesium sulphate, aluminum chloride and silicofluorides have also been used as hardeners.

Although relatively coarse sand and gravel can be consolidated to a certain extent by these processes, e.g. for the purpose of consolidating building sites, a high degree of consolidation cannot be achieved because the hardening of water glass is accomplished by a considerable volumetric shrinkage so that the composite mass produced becomes detached from the surfaces of the cracks and fissures.

The present invention solves the problem of providing a process for the consolidation and sealing of geological and artificially deposited rock and earth formations which obviates the disadvantages described above of the known consolidation processes and achieves satisfactory strength values as well as being resistant to moisture and non-combustible.

According to the invention, this problem is solved by mixing intimately polyisocyanate with water glass solutions and leaving the resulting emulsion to harden in the formation which is required to be consolidated. The solid masses which form have excellent adherence to dry and wet geological formations, particularly since the shrinkage which normally occurs when water glass solutions are hardened without the addition of polyisocyanates is completely absent and instead, the bond is strengthened by a certain increase in volume during hardening. One special advantage of coal mining is that the hardened consolidating agent is non-inflammable and the composite mass which forms in the gaps and cracks and the like is of great strength which is highly advantageous for stabilizing the formation.

It is surprisingly found that hardened composite masses also adhere to fatty coal such as coal which has a relatively high bitumen content, so that excellent consolidation is obtained for every type of coal.

SUMMARY OF THE INVENTION

The present invention relates to a process for consolidating and sealing off geological and artificially deposited rock and earth formations by mixing water glass solutions with polyisocyanates and allowing these emulsions to harden in the formations. The mixture may be introduced into the formations which are required to be consolidated, e.g. deposits of coal, by forcing the mixture under pressure into bore-holes in the formations. Alternatively, multi-chamber cartridges containing the water glass solutions and polyisocyanates in separate compartments are introduced into the bore-holes and subsequently destroyed in order to mix the components.

Various additives such as accelerators, blowing agents, polyols, stabilizers and/or thixotropic agents may also be added to improve the quantity of the composite masses formed by hardening of the mixture.

DETAILED DESCRIPTION OF THE INVENTION

The polyisocyanates used for the purpose of the invention may in principle be any organic polyisocyanates having aliphatically, cycloaliphatically, araliphatically, aromatically or heterocyclically bound polyisocyanate groups, e.g. those described by W. Siefken in "Justus Liebigs Annalen der Chemie" 562, pages 75–136, but it is preferred to use the polyisocyanates with aromatically bound polyisocyanate groups commonly used in polyurethane chemistry which are liquid at room temperature. Examples of these polyisocyanates include 2,4-diisocyanatotoluene, 2,6-diisocyanatotoluene and any mixtures of these isomers ("TDI"), polyphenyl-polymethylene polyisocyanates which may be prepared by aniline/formaldehyde condensation followed by phosgenation ("MDI") and derivatives of these polyisocyanates which contain carbodiimide groups, biuret groups, urethane groups or allophanate groups and are liquid at room temperature. The polyisocyanate mixture ("MDI") which has been obtained by the phosgenation of aniline/formaldehyde condensates and is liquid at room temperature and its isocyanate-containing reaction products obtained by reacting them with sub-equivalent quantities (NCO/OH molar ratio from about 1:0.005 to about 1:0.3) of polyhydric alcohols with molecular weights ranging from about 62 to 3,000, in particular with polyols in the molecular weight range of about 134 to 3,000 which contain ether groups, are particularly preferred.

by "water glass solutions" are meant solutions of sodium and/or potassium silicate in water. Crude commercial products possibly containing, for example, calcium silicate, magnesium silicate, borates and aluminates may also be used. The molar ratio of $SiO_2:M_2O$ (M=metal) may vary within the limits of about 0.5:1 to about 4:1. It is preferred to use water glass solutions having a ratio of $SiO_2:M_2O$ in the range of about 1:1 to about 2.5:1. The concentration of water glass solution may be chosen in the range about 25 to 55% by weight, preferably about 40 to 50% by weight.

The proportion by weight of polyisocyanate to water glass in the mixture to be formed may vary within wide limits, i.e., from about 75:25 to about 15:85. It is preferred to use a ratio by weight of polyisocyanate to water glass in the region of about 60:40 to about 25:75.

Preparation of the mixture of polyisocyanates and water glass solutions is a simple procedure. All that is necessary is to mix the two liquids homogeneously, e.g. by stirring by hand, using stirrer blades, or with the usual motor driven stirrers. The emulsions may also be prepared in mixing and dosing apparatus, in which case the two liquids are delivered to a throughflow mixer from dosing pumps. The dosing pumps may be, e.g. gear-wheel pumps, piston pumps or diaphragme groups. The throughflow mixers are, for example, mixing chambers with driven stirrers or static mixers, e.g. tubes with variously arranged baffle plates.

The mixture is generally forced into the formation or into bore-holes in the formation through lances or pipes. Bore-holes should be closed immediately after the mixture has been forced in since gelling and subsequent hardening of the mixture begins only after 30 to 60 seconds. If the mixture is to be introduced into boreholes, it is suitably introduced through bore-hole covers acting as valves, e.g. according to German Pat. No. 2,550,555.

Depending on the nature of the polyisocyanate, the selected mixing process, the desired degree of foaming of the consolidating agent and its consistency, it may be advisable to add the following additives to the polyisocyanate or to the water glass solution or the mixture of polyisocyanate and water solution:

1. Accelerators as commonly used in polyurethane chemistry. Examples include organo-metallic compounds such as dibutyl tin dilaurate and tertiary amines such as triethylamine. The quantities added may be up to about 2% by weight, based on the mixture of polyisocyanate and water glass solution.

2. Blowing agents, e.g. acetone, methylene chloride, monofluorotrichloromethane, dichlorodifluoromethane and butane. The quantities added may be up to about 30% by weight, based on the mixture of polyisocyanate and water glass solution.

3. Compounds having at least one polyisocyanate reactive groups. These compounds are generally added to the reaction mixture in quantities of up to about 30% by weight, based on the water glass solution. Organic polyamines such as ethylene diamine, diethylene triamine, triethylene tetramine, 4,4'-diaminodiphenyl methane or 2,4'-diaminotoluene may be used, but organic compounds having alcoholic hydroxyl groups are preferred. These include simple monohydric or polyhydric, preferably polyhydric alcohols with molecular weights in the range of about 32 to 200, preferably about 62 to 200, or the usual relatively high molecular weight polyhydroxyl compounds with molecular weights from about 200 to 5,000, preferably about 200 to 1,000, commonly used in polyurethane chemistry, e.g. the known polyhydroxyl polyesters or polyhydroxyl polyethers. Examples of suitable lower molecular weight alcohols include methanol, ethanol, propanol, ethylene glycol, diethylene glycol, triethylene glycol, glycerol and trimethylol propane. Examples of relatively high molecular weight alcohols include polyesters of dicarboxylic acids such as phthalic acid, adipic acid, hexahydrophthalic acid, tetrahydrophthalic acid and/or maleic acid and the above-mentioned simple alcohols or polyether polyols such as can be obtaind by alkoxylation, i.e. in particular by the chemical addition of propylene oxide and/or ethylene oxide to low molecular weight starter molecules. Water and, for example, the above-mentioned low molecular weight amines or alcohols which have at least two active hydrogen atoms are suitable starter molecules.

Particularly, preferred alcohols are the lastmentioned polyether polyols with hydroxyl numbers in the region of about 50 to 600. The alcohols may be added either to the water glass solution or to the polyisocyanate or as third component to the mixture of polyisocyanate and water glass. Mixtures containing the compounds mentioned above as additives have hitherto produced the best solidification values and therefore constitute a particularly preferred embodiment of the invention.

4. Emulsifiers, e.g. reaction products of stearylamine and ethylene oxide, polyether esters of abietic or oleic acid and ethylene oxide, fatty alcohol polyglycol ethers, alkyl phenol polyglycol ethers, emulsifiers based on waterglass, e.g. Tegosivin of Goldtschmit AG, amphogensides, e.g. Tego-Betain 27 of Goldtschmit AG, and fatty acid amido alkyl dimethyl aminoxide, e.g. aminoxide WS 25 of Goldtschmit AG. These emulsifiers particularly promote the emulsification of the compound of category 3 in the waterglass component and hence also promote complete mixing of all the components. The emulsifiers are generally added in quantities of up to about 15% by weight, based on the mixture of polyisocyanate and waterglass solution.

5. Thixotropic agents such as powdered asbestos or other surface active additives alone or mixed with the emulsifiers mentioned under category 4. These thixotropic agents are preferably used when mixtures of waterglass solution and the compounds mentioned under category 3 are used. They also make it possible for emulsions to remain stable for a considerable period so that two-component systems comprising a package of waterglass solution and additives or categories 1 to 4 and a package of polyisocyanates can be handled at the site of consolidation. The thixotropic agents are generally added in quantities of up to about 5% by weight, based on the mixture of polyisocyanate and waterglass solution.

6. Foam stabilizers, e.g. the organo-polysiloxanes known from polyurethane chemistry.

Any of the above-mentioned additives may be added either alone or in combination with each other either to the mixture or to the components before they are mixed.

Multi-chamber cartridges containing the polyisocyanate, the waterglass solution and possibly additives of categories 1 to 6 in separate containers may also be introduced into the above-mentioned boreholes. After mechanical destruction of the cartridges and mixing of the liquid contents, e.g. by means of a rotating wooden or metal rod or an anchor blade stirrer, the hardening foaming mixture enters under its own foaming pressure into the formations which are to be consolidated and sealed off and at the same time also completely fills the bore-hole.

A summary of examples of mixtures which may be used and of the practical application of the process is given in the following Tables and Examples.

The various entries have the following meaning:

MDI: a polyisocyanate obtained by phosgenating a formaldehyde aniline condensate and containing more than 50% of diisocyanatodiphenyl methane and having an isocyanate content of 31% and a viscosity of 95 mPas at 25° C.

Accelerator: Dibutyl tin dilaurate.

Polyol 1: a polyether polyol prepared from trimethylol propane and propylene oxide and having an OH number of 370 and a viscosity of 700 mPas at 25° C.

Polyol 2: a polyether polyol prepared from 1,2-propylene glycol and propylene oxide and having an OH number of 59 and a viscosity of 410 mPas at 25° C.

Emulsifier: a commercial alkyl phenol polyglycol ether (akyporox NP 105, Chemy, Emmerich).

Powdered Asbestos: a commercial product of Crace (Silodex 24).

Stabilizer: a commercial polyether polysiloxane stabilizer (Stabilizer SJ, Bayer AG).

TABLE

| Component A | Component B | Ratio by Weight Waterglass: Isocyanate | Molar Ratio $SiO_2:Na_2O$ |
|---|---|---|---|
| (1.) 80 g Waterglass 44% 20 g Polyol 1 | 90.4 g MDI | 80:90 | 2:1 |
| (2.) 40 g Waterglass 44% 10 g Polyol 1 0.9 g Accelerator 10 g Blowing Agent | 60 g MDI | 40:60 | 2:1 |
| (3.) 80 g Waterglass 44% 20 g Polyol 1 0.6 g Accelerator 0.5 g Stabilizer | 75 g MDI | 80:75 | 0.5:1 |
| (4.) 75 g Waterglass 44% 25 g Polyol 1 1.6 g Accelerator | 25 g MDI | 75:25 | 2:1 |
| (5.) 80 g Waterglass 50% 15 g Polyol 1 5 g Polyol 2 2 g Accelerator | 85 g MDI | 80:36 | 2:1 |
| (6.) 50 g Waterglass 28% 30 g Polyol 1 2 g Accelerator | 40 g MDI | 50:40 | 4:1 |
| (7.) 25 g Waterglass 44% 6.25 g Polyol 1 | 75 g MDI | 25:75 | 2:1 |
| (8.) 50 g Waterglass 28% 40 g Polyol 1 10 g Polyol 2 | 50 g MDI | 50:50 | 2:1 |
| (9.) 80 g Waterglass 44% 20 g Polyol 1 10 g Polyol 2 1 g Accelerator | 72 g MDI | 80:72 | 1:1 |
| (10.) 90 g Waterglass 44% 10 g Polyol 1 30 g Blowing Agent 0.6 g Accelerator | 90 g MDI | 90:90 | 2:1 |
| (11.) 80 g Waterglass 44% 20 g Polyol 1 0.3 g Accelerator 1.0 g Emulsifier 1.0 g Powdered Asbestos | 51 g MDI | 80:51 | 2:1 |
| (12.) 80 g Waterglass 44% 15 g Polyol 1 5 g Polyol 2 0.3 g Accelerator 1.0 g Emulsifier 1.0 g Powdered Asbestos 1.0 g Stabilizer | 90 g MDI | 80:90 | 2:1 |

The waterglass used in the following Examples was a 44% by weight aqueous solution of a sodium silicate ($SiO_2:Na_2O = 2:1$).

EXAMPLES

Example 1

In a seam of 4 m average thickness and 0 to 10 gon dip the coal face sloped off by up to 3.5 m. This resulted in roof fall of up to 7 m height and an over a length of 30 m. In 7 m spacing boreholes of 4.5 m length and 45 mm dia. were drilled into the coal face.

The consolidating agent used consisted of:
Component A: waterglass
Component B: MDI.

Components A and B used in a ratio by weight of 1:1 were forced under pressure into the bore-holes through a bore-hole seal by way of a two-component mixing and pressurizing device so that 120 kg of the mixture of components A and B entered each bore-hole.

Five hours later the consolidated zone was worked by shearer loader. It was found that the surfaces of the gaps and crack in the coal were glued together and a satisfactory consolidating effect had been obtained. The coal face now sloped only slightly and normal production could be continued.

Example 2

In the same coal face where tests described under example 1 were run, consolidation work was continued in the trouble zone, however, a polyol was added to the consolidation agent. The agent consisted of the following components:

Component A:
mixture of 80 parts by weight of waterglass,
20 parts by weight of polyol 1 and
0.3 parts by weight of accelerator.

Component A was prepared from the above constituents by mixing with the aid of a mechanical stirrer immediately before injection. The emulsion obtained in this manner remained stable for several hours.

Component B: MDI.

The coal face was consolidated as in Example 1. Components A and B were used in a ratio by weight of 1.3:1.

The consolidating effect was complete. Sloping of the coal face was completely eliminated.

Example 3

When working is 1.3 m thick seam inclined by 0 to 59 gon, the gateroad side had to be consolidated. The roof consisted of solid laminated clay, and the floor of sandstone. The roof in the face ends showed signs of strong disaggregation over a length of 1.5 to 2 m, measured in direction of the dip. Fissures of up to 2 cm width were stated. For consolidation, holes of 2.5 m depth and 45 cm dia. were drilled 60 cm above the seam. The spacing of the boreholes along the gateroad side was of 2.5 to 3 m. In a first phase four boreholes were drilled.

The following consolidating agent was used:
Component A:
 mixture of 90 parts by weight waterglass,
 10 parts by weight polyol 2 and
 1 part by weight accelerator.
Component B: MDI.

90 kg of the mixture of A and B (ratio by weight 1.5:1) were introduced into the first bore-hole through a pressurizing device. 260 kg were forced into the second bore-hole, 350 kg into the third and 129 kg into the fourth. The consolidation achieved was so satisfactory that no breaks occurred in the face end zone. Samples of rock found in the break showed that cracks and fissures in the rock had been completely filled and perfectly sealed with the hardened foam of components A and B.

EXAMPLE 4 in a retreat face the face-end zone had to be consolidated in an area up to 15 m ahead of the coal face by polyurethane. Since in this area the rock strata were very wet and since the gaps and fissures were filled with water, no sufficient consolidation effect could be reached with a known polyurethane system. Boreholes of 5 m length and rising at a 10° angle were drilled into the roof 5 m ahead of the coal face. By these boreholes a total of 1000 kg of the following blend were introduced.

Component A:
 mixture of 80 parts by weight of waterglass,
 10 parts by weight polyol 1,
 10 parts by weight polyol 2,
 5 parts by weight emulsifier,
 1 part by weight accelerator,
 1 part by weight powdered asbestos.
Component B: MDI.

The ratio by weight of components A to B was 1:1.2.

On passing through the consolidated trouble zone in the tunnel, it was found that the roof was completely free from the breaks which occurred in the non-consolidated zone.

EXAMPLE 5

When the earth was dug out at a building site for constructing an underground railway, ground water and quicksand were flushed out of a gap (15 meters in height, 0.7 meter in width) into the tunnel space. Attempts to consolidate the quicksand by the injection of cement or waterglass into the walls produced no results.

The following mixture of waterglass and polyisocyanate was then introduced through injection lances placed in the quicksand:

Component A:
 mixture of 80 parts by weight of waterglass,
 1 part by weight of accelerator.
Component B: reaction product of 90 parts by weight of MDI and 10 parts by weight of polypropylene glycol with hydroxyl number 56.

The ratio by weight of components A and B was 1:1.

A total of 100 kg of this mixture was injected into the slit through the lance. The quicksand was found to be consolidated after only 15 minutes. Another injection lance placed below the first point of injection was introduced into the quicksand to a depth of 1300 mm. 70 kg of the mixture of components A and b were forced in through this lance at a pressure of 50 bar. This additional injection made it possible for the wall in the zone consolidated by the injection to be sealed off against water and quicksand. Samples of the consolidated quicksand were found to have a strength of about 12 kp/cm$^2$.

Example 6

In a seam with an average thickness of 2.80 m and an inclination of 5 gon the coal face sloped off by 3.5 m over a length of 40 m, measured from the supply gate. This caused roof fall which strongly affected production of the coal face. The resulting cavities had to be supported with wooden props. The face in these zones had to be advanced in handwork.

Bore-holes 50 mm in diameter and placed at a dip of ca. 10 gon were sunk into the coal face in the critical zone at intervals of 1.5 meters and about 0.5 meters below the roof. 6 two-chamber cartridges of polyethylene were inserted into each bore-hole. The inner chamber of the cartridge contained the polyisocyanate while the outer chamber contained a component of the following composition:
 90 g waterglass,
 10 g polyol 1,
 0.6 g accelerator, dibutyl tin dilaurate.

The cartridge contained the two components in a proportion by weight of 1:1. The cartridges were destroyed inside the bore-holes by means of rectangular wooden nails having an edge of 32mm. The components were thoroughly mixed by rotating the wooden nails, and the bore-holes were then sealed with a plug. When the face was mined 2½ hours later, it was found that sloping of the coal face could be prevented as a result of the consolidation.

Example 7

The cartridge used was a glass tube having a length of 60 cm, an internal diameter of 2.6 cm and a wall thickness of 1 mm. This tube was filled with 200 g of the following mixture:
 160 g waterglass,
 40 g polyol 1.

This tube contained another sealed glass tube having a length of 59 cm, an internal diameter of 1.6 cm and a wall thickness of 1 mm as inner cartridge. This cartridge was filled with 102 g of a polyisocyanate mixture of the diphenyl methane series having a viscosity of 100 mPas/25° C. and an isocyanate content of 32% by weight.

The cartridge sealed with a plastics bung was introduced into a bore-hole 30 mm in diameter. An anchor rod 24 mm in diameter was pushed into the bore-hole and rotated at 350 revs. per min. The cartridge was thereby destroyed and the components intimately mixed. Bending was achieved over a length of 110 cm. The anchor rod was pulled after 30 minutes. A pull of 24 tons was necessary to remove the rod from the borehole.

Although the invention has been described in detail for the purpose of illustraton, it is to be understood that such detail is solely for that purpose and that variations can be made therein by those skilled in the art without departing from the spirit and scope of the invention except as it may be limited by the claims.

What is claimed is:

1. A process for consolidating geological rock formations and coal deposits which comprises
   (a) intimately mixing
      (i) a waterglass solution,
      (ii) a polyisocyanate which does not contain chemically incorporated emulsifiers selected from the group consisting of 2,4-diisocyanatotoluene; 2,6-diisocyanatotoluene; mixtures of these isomers; a polyphenyl-polymethylene polyisocyanate which corresponds to the phosgenation products of the aniline/formaldehyde condensation reaction; and reaction products of said phosgenation products with polyhydric alcohols which have molecular weights ranging from about 62 to 3,000 wherein the NCO/OH molar ratio is about 1:0.005 to 1:0.3, and
      (iii) up to about 30% by weight based on the weight of the waterglass solution of a compound having at least one polyisocyanate reactive group and which does not contain chemically incorporated emulsifiers,
   wherein the proportion by weight of component (ii) to component (i) is in the range of about 75:25 to about 15:85, and
   (b) introducing said mixture into said formation or said deposit which is required to be consolidated and allowing it to react to form a foamed, hardened composition which adheres to the surfaces of said formation or said deposit.

2. The process according to claim 1 which comprises adding up to about 2% by weight, based on the weight of components (i) and (ii), of a polyaddition accelerator.

3. The process according to claim 2 characterized in that said accelerator is an organo-metallic compound.

4. The process according to claim 5, characterized in that said organo-metallic compound is dibutyl tin dilaurate.

5. The process according to claim 2, characterized in that said accelerator is a tertiary amine.

6. The process according to claim 5, characterized in that said tertiary amine is triethylamine.

7. The process according to claim 1 which comprises adding a blowing agent in quantities of up to about 30% by weight, based on the weight of components (i) and (ii).

8. The process according to claim 7, characterized in that said blowing agent is selected from the group consisting of acetone, methylene chloride, monofluorotrichloromethane, dichlorodifluoromethane and butane.

9. The process according to claim 1, characterized in that the compound having at least one polyisocyanate reactive group is a polyhydroxyl compound.

10. The process according to claim 9, characterized in that said polyhydroxyl compound is a polyether polyol having a hydroxyl number from about 50–600.

11. The process according to claim 9, characterized in that said polyhydroxyl compound is a polyester polyol having a hydroxyl number from about 50–600.

12. The process according to claim 1 which comprises adding thixotropic agents and emulsifiers to stabilize said mixture.

13. The process according to claim 1 which comprises incorporating foam stabilizers into said mixture.

14. The process according to claim 1 which comprises introducing said mixture under pressure through bore-holes or injection lances into the said formations or said deposits which are required to be consolidated.

15. The process according to claim 1 which comprises introducing said components into separate containers of a multi-chamber cartridge and subsequently mixing said components after their introduction into said formations or said deposits by destroying the cartridge.

16. The process according to claim 1, characterized in that the proportion by weight of polyisocyanate to waterglass solution is in the range of about 60:40 to about 25:75.

17. The process according to claim 1, characterized in that component (ii) is a polyphenyl-polymethylene polyisocyanate which corresponds to the phosgenation products of the aniline/formaldehyde condensation reaction.

18. A process for consolidating geological rock formations and coal deposits which comprises
   (a) intimately mixing
      (i) a waterglass solution,
      (ii) a polyisocyanate selected from the group consisting of 2,4-diisocyanatotoluene; 2,6-diisocyanatotoluene; mixtures of these isomers; a polyphenyl-polymethylene polyisocyanate which corresponds to the phosgenation products of the aniline/formaldehyde condensation reaction; and reaction products of said phosgenation products with polypropylene glycols wherein the NCO/OH molar ratio is about 1:0.005 to 1:0.3, and
      (iii) up to about 30% by weight based on the weight of the waterglass solution of a compound having at least one polyisocyanate reactive group and which does not contain polyether segments containing ethylene oxide units,
   wherein the proportion by weight of component (ii) to component (i) is in the range of about 75:25 to about 15:85, and
   (b) introducing said mixture into said formation or said deposit which is required to be consolidated and allowing it to react to form a foamed, hardened composition which adheres to the surfaces of said formation or said deposit.

* * * * *